Nov. 27, 1956 E. L. LUKEMIRE 2,771,823
PAPERMAKING WITH CLOSED WATER SYSTEM
Filed July 28, 1950 3 Sheets-Sheet 3
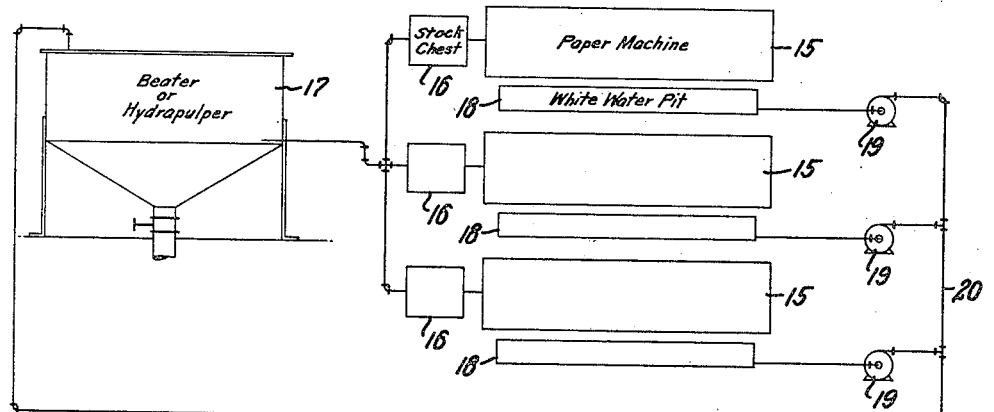
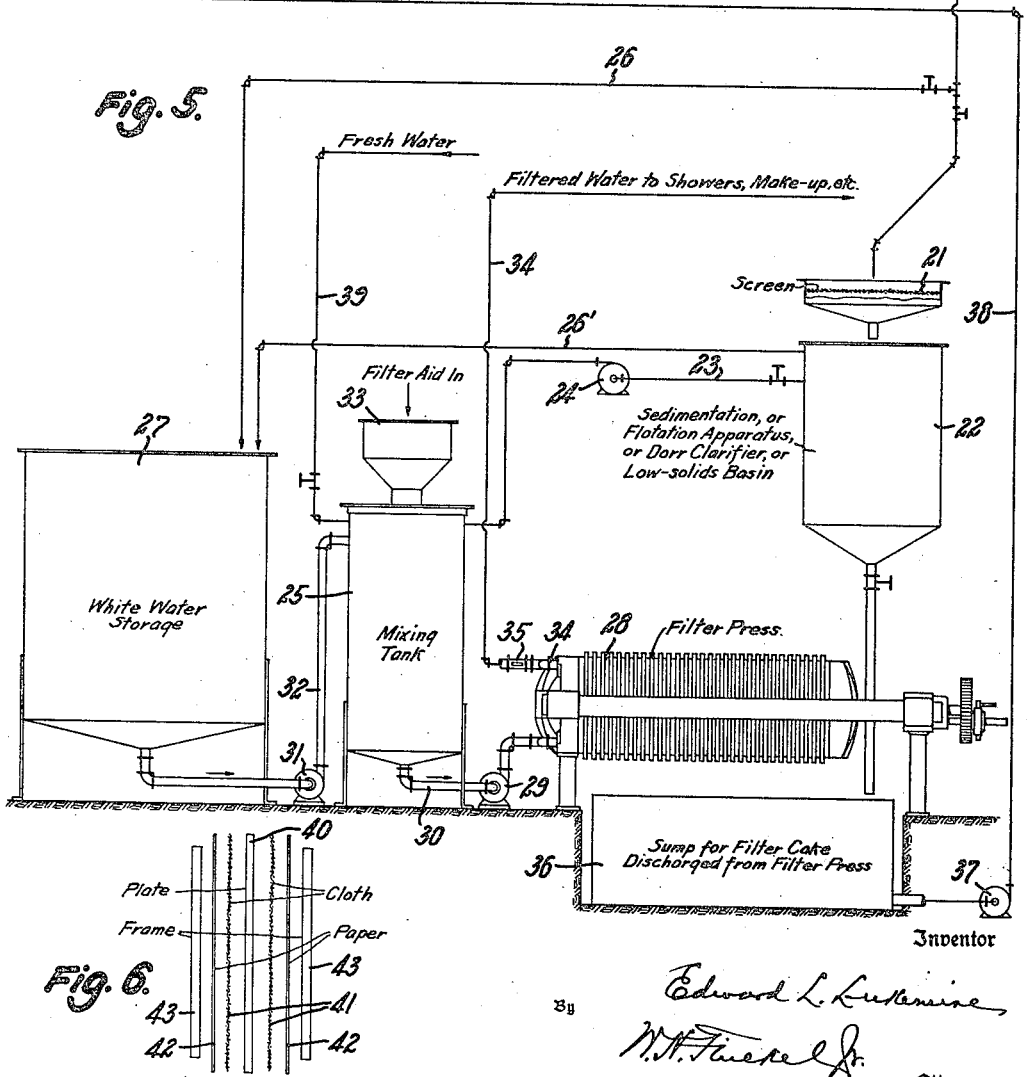
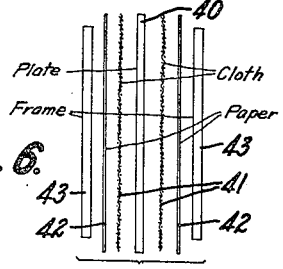

United States Patent Office 2,771,823
Patented Nov. 27, 1956

2,771,823

PAPERMAKING WITH CLOSED WATER SYSTEM

Edward L. Lukemire, Rittman, Ohio, assignor, by mesne assignments, to The Ohio Boxboard Company, Rittman, Ohio, a corporation of Ohio Application July 28, 1950, Serial No. 176,397

5 Claims. (Cl. 92—38)

This application is a continuation-in-part of my application for patent for Paper Making with Closed Water System, filed November 4, 1946, Serial No. 707,577, which became abandoned as of August 2, 1950.

The invention relates, broadly, to the filtration of water used in paper manufacture, and particularly of paper-mill white water for the recovery therefrom of re-usable paper fibres and other valuable constituents incorporated in the paper stock, the clarification of both fresh or raw water and white water so that it may be economically used in the paper-making operation, especially in the so-called high pressure-low-volume showers employed on paper and paperboard machines, and the collection of bacteria, fungi and other micro-organisms, colloidal material and other putrescible matter, to the end that paper and paperboard machines may be operated upon a closed, or substantially closed, water system, with economies in water consumption and fuel for power and heating thus attained, and the losses in paper stock and likelihood of contamination of streams or other bodies of water by waste white water discharged thereinto overcome.

Thus, one object of the invention is to provide a filtering and circulating system by which the quantity of fresh or raw water introduced into the paper-making system may be reduced to almost any desired extent, the ultimate reduction being to the quantity evaporated from the wet sheet plus incidental losses by leakage and evaporation at other points in the system.

Another object of the invention is to so manipulate the white water from the paper-making machine that it may be reused for any desired purpose and in any part of the water supply system, thus avoiding not only loss of water by run-off of white water but also the loss of fibre which it contains.

A further object is to so purify either the white water or fresh water entering the operation as to permit it to be used in high pressure showers having minute orifices, thus materially reducing the quantity of water to be pumped and the cost of power for pumping.

Still another object is to accomplish the purification of either fresh or recycled water by the use of agents which are desirable additives to the finished paper and which ultimately become incorporated therein.

Paper-making plants located adjacent to lakes or large streams often are able to pump any desired quantities of fresh water at relatively low cost. But plants which have to depend on wells for their supply of water are in many cases hard pressed for adequate supplies. Not only are underground supplies being drawn from constantly increasing depths, but the lowering of the water table in industrial areas is becoming a serious problem. In some localities the shortage of underground water has become so acute that it is even proposed to ration the available water to industries now operating, the establishment of new industries in such localities being thus seriously hazarded. In such situations the paper manufacturer is likely to be the worst sufferer by reason of the relatively large relation of water consumption to output in this industry.

Furthermore, in the case of paper-mills as of some other industries, the disposal of waste waters carrying any suspended matter is a source of difficulty by reason of the rigid rules against stream pollution, many regulatory bodies holding that the fibrous and other suspended solid waste from paper-mills is highly detrimental to many forms of aquatic life.

Again, while the proportion of fibre remaining in the white water after it has been treated by present methods of separation is small, the quantity of run-off water is often so great that the aggregate loss of fibre is a material item of cost.

For these and other reasons it is highly desirable to reduce the consumption of fresh water and the discharge of waste water to the last degree possible, and some progress in that direction has already been made. It is customary to provide settling pits or savealls and often to use thickening apparatus in connection with them, thus separating and saving part of the suspended fibre and effecting a partial purification of the white water. Various experiments have also been made in the use of sand filters, filters using paper pulp and the like for recovering used waters and fitting them for reuse. Such experiments have been only moderately successful and in no instances of which I am aware has it proven possible to recycle all waste water and thus close up the water system so far as overflow is concerned, or to bring either white water or fresh water to a degree of purity making possible the continuous operation of the high pressure types of shower, having minute orifices, without danger of the orifices plugging.

The difficulty in reducing the run-off from a paper mill originates in a combination of conditions. The beaters do not require clear water except for making white liners and other white papers, and are ordinarily supplied with white water returned from the cylinders or Fourdrinier wire without clarification. The actual water supply to the plant is thus mainly governed by the requirements of the showers used for cleansing cylinders, Fourdrinier wires, felts and the like, plus a small loss by evaporation and leakage.

Some of the cleansing operations may be performed with water which is not entirely clear, such as that returned from a saveall. Other operations, such as those performed by the deckle showers, the liner cylinder showers and certain of the felt showers, require a water which, if not entirely clear, must at least be purer than the saveall can supply, and these showers have perforce been supplied with fresh water.

It is well known that water consumption may be sharply reduced where it is possible to make use of the so-called oscillating type of shower. These elements differ from the ordinary shower pipe in having very small orifices (of the order of between .020" and .035" diameter) and operating at a high pressure (say between 65# and 150# gauge), the orifices preferably being spaced from 1½" to 3" apart, depending upon the particular use of the shower, and the shower pipe being arranged for axial reciprocation with a relatively short stroke (say approximately 6"). These high pressure showers, which function by jetting rather than by flooding the surface to be cleansed, are extremely efficient and perform the work of the ordinary, low pressure shower with the use of from one fifth to one-tenth the quantity of water.

Experience has shown, however, that the high-pressure oscillating shower is useful only with very pure and clean water. Either mineral sediment or any trace of fibre or of algae causes rapid choking of the jets, and even perfectly clear waters are unsuitable if they contain appreciable quantities of iron, calcium or other scale forming ingredients. Thus, white waters, even after careful settling or passage through a saveall, cannot be used in showers of this type, and it is rarely the case that even the fresh water supply can be so introduced. Thus recourse is ordinarily had to the flooding type of shower, which, by reason of its much larger openings, is less subject to choking, and the water consumption of which makes the consumption in the plant mount accordingly.

I have discovered that by filtering a very small proportion (ordinarily from 3% to 5%) of the total drainage from the papermaking machine, with a suitable filter aid hereinafter described, to a condition of substantial clarity and freedom from fibre, several highly desirable results may be attained. Primarily, water wastage from the plant is completely avoided and with it the risk of stream pollution; loss of fibre is eliminated, and the requirement for fresh water is reduced to an insignificant quantity. The quantities of water supplied to the showers may be greatly reduced by the use of high pressure showers hereinbefore referred to, making for better machine operation and reducing pumping costs. No heat is lost in run-off water and all chemical additives such as alum and slime inhibitors, bactericides and fungicides are returned to the operation and retained in the system until consumed. Finally, the filter cake, comprising the filter aid together with fibre, pigments and other suspended solids recovered from the white water, is returned to the stock supplied to the machine. The filter aid thus introduced into the paper is a desirable filler, improving the properties of the paper and replacing an equal weight of more costly fibre.

Moreover, the collection by the filter at one easily accessible point of all filtered-out material, including noxious constituents of the water, such as bacteria, fungi and other micro-organisms, makes possible effective sterilization of the collected material and of the filtrate, as disclosed in my copending application for patent for Treatment of Mill Waste, filed June 30, 1950, Serial Number 171,471.

Because of the relatively small quantity of water requiring filtration, these results are attained with the use of a small proportion of filter aid, far below the proportion which may desirably be added to the paper, and with a very moderate footage of filter press capacity.

In the accompanying drawings illustrating the invention, in certain figures of which like parts are similarly designated, Fig. 1 is a flow diagram having reference to a twenty ton per hour paperboard or boxboard plant having cylinder machines, the water supplied to this plant being unsuitable for use in high pressure-low volume showers, and showing the quantities of fresh and of recycled water supplied to the various elements of the plant as originally equipped with settling pits and thickeners;

Fig. 5 is a schematic view of apparatus for effectively carrying out the filtration practice of the invention, and Fig. 6 is a somewhat diagrammatic, expanded edge view of a set of elements of a filter press appropriate to the apparatus illustrated in Fig. 5.

Figure 1:
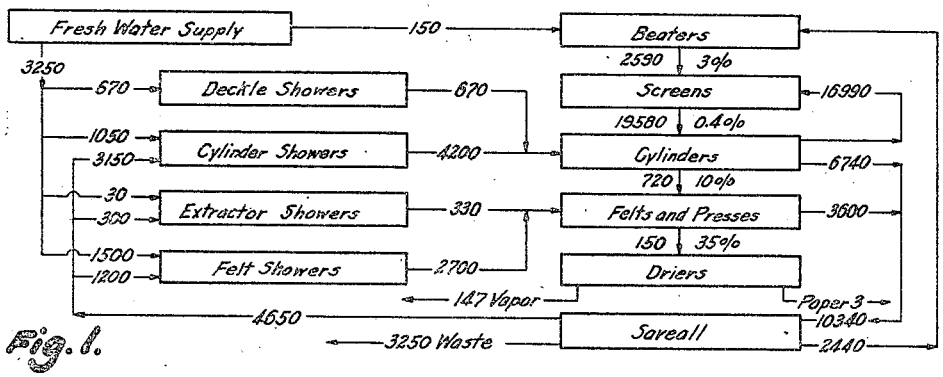

Referring to Fig. 1, which illustrates the conventional system of using fresh water without diatomaceous earth or other filter aid filtration and of recovering the white water in a saveall and/or settling pits and thickeners, it will be understood that the deckle showers in this plant cannot use the white water so recovered, even when they are of the low pressure type, and the cylinder, extractor and felt showers can use it only in part. As the fresh water with which this plant is supplied is insufficiently clear and pure to be used in high pressure showers, those of the low pressure type are used throughout, consuming 4650 gals. per min. of white water and 3250 gals. per min. of fresh water, the latter being pumped from wells at heavy cost for power. In addition, the beaters making white liner stock require 150 gals. per min. of fresh water, a total of 3400 gals. per min. or something less than five million gallons per twenty-four hours.

The saveall receives 6740 gals. per min. from the cylinders and 3600 gals. per min. from the felts and presses, a total of 10,340 gals. per min. Of this quantity, after settling, 2440 gals. returns to the beaters and 4650 gals. is used as such in the showers. The wet sheet carries 150 gals. per min. to the driers, and the remainder, 3250 gals. per min., or four and two-thirds million gallons per day, runs to waste and carries with it a large quantity of fibre which is thus lost. No filter aid is used and no filtering expense is involved.

Figure 2:
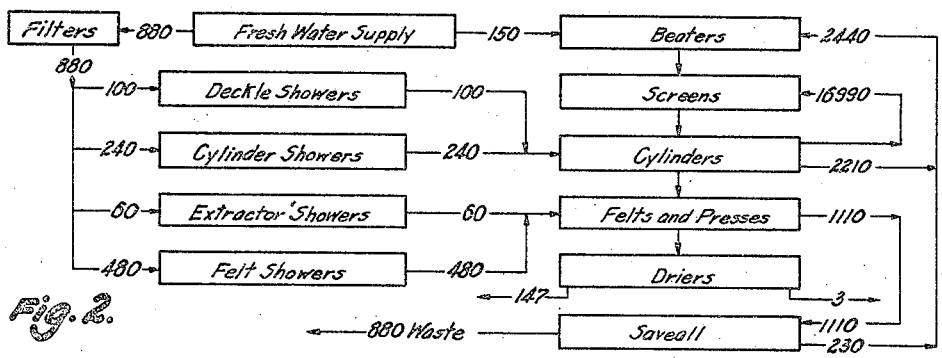
Fig. 2 is a flow diagram showing the same plant but illustrating the water flows when the settling and thickening arrangements are replaced by a filtering plant handling the fresh water supply, permitting oscillating showers to be used throughout.

In the layout shown in Fig. 2, the well water, other than that supplied to the beaters, is filtered to clarity with a very small proportion of filter aid, making it possible to use high pressure showers throughout. The use of these showers reduces the water consumption of the entire battery of showers to 880 gals. per min. and, including 150 gals. per min. to the liner stock beaters, the quantity of fresh water pumped is 1030 gals. per min. or slightly less than one and one-half million gallons per day.

The saveall receives 1110 gals. per min. from felts and presses, of which 230 gals. returns to the beaters and 880 gals. per min. or about one and one quarter million gallons per day runs to wastse, carrying with it, on the average, about one-fourth as much fibre as in the preceding example.

In this example the filters in fresh water service have a throughput capacity of about 3 gals. per min. per square foot, the supply of 880 gals. per min. thus requiring rather less than 300 sq. ft. of filtering area. The consumption of filter aid may range between .000105% and .01% of the weight of the water handled, or between 11 lbs. and 1052 lbs. per twenty-four hours, depending upon the nature and coarseness of the material suspended in or carried by the water and the desired rate of flow through the filter. If such suspended or carried material to be filtered out is entirely mineral and relatively coarse it has been found that very little filter aid is required to accomplish the desired clarity of filtrate and rate of flow of the filter. However, if the suspended or carried material is very fine, and especially if it is desired to substantially free the filtrate of organisms, such as bacteria and fungi, the amount of filter aid required will be substantially increased, particularly if it is important that the rate of flow be maintained.

As a specific example it was found that satisfactory filtration could be accomplished with .01% of filter aid by weight, or about 1052 lbs. per twenty-four hours. However, this is to be understood as representative only, and that the percentage of filter aid used may be greater or less as conditions may dictate.

Although the filter cake contains no fibre, it may be passed to the beaters if not too heavily contaminated, and even if thus contaminated it may safely be so passed to the beaters if previously sterilized as disclosed in my copending application Serial No. 171,471 hereinbefore referred to.

Figure 3:
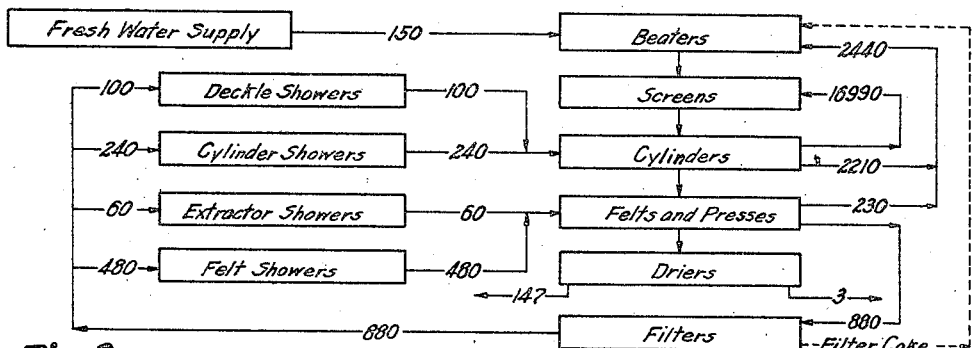
Fig. 3 is a flow diagram showing the same plant but illustrating the water distribution when the settling and thickening arrangements are replaced by a filtering plant handling sufficient white water to supply all of the showers, same being of the high pressure-low volume type.

In the layout shown in Fig. 3, the only fresh water supply is the 150 gals. per min. to the liner stock beaters, a total of 216,000 gals. per day. The run-off from the cylinders returns in large part to the screens, the remainder together with 230 gals. per min. from the felts and presses going to the beaters. The remainder of the run-off from the felts and presses, amounting to 880 gals. per min., passes to the white water filters where it is brought to a condition of freedom from fibre and of substantial clarity which permits it to be used in high pressure showers. There is no run-off from the system, which is thus closed, the 150 gals. per min., to the liner stock beaters balancing the 147 gals. evaporated by the driers and the three gallons passing out as water content of the finished paper.

The white water filters are slower than those used for handling fresh water, the average throughput being from about 25 gals. to 15 gals. per square foot hour, the required filtering area being from about 2100 sq. ft. to 3520 sq. ft. These filters require a greater proportion of filter aid to water handled. From 5 lbs. to 12.5 lbs. of the filter aid to 1000 gals. of water, or .0061% to .15% by weight of the water, or from 633.6 lbs., to 16000 lbs. per twenty-four hours. As a specific example it was found that satisfactory filtration could be accomplished with .15% of filter aid by weight, or about 16,000 lbs. per twenty-four hours. But here again this must be taken as representative only, it having been demonstrated that proper and saisfactory filtration may be had with a much lower percentage of filter aid, as hereinbefore indicated, the amount being governed in great measure by the characteristics of the white water being filtered and the rate of flow through the filter to be maintained.

The filter cake, containing this filter aid together with the recovered paper fibres, is returned to the stock, as for example to the beaters, as indicated by the broken line of Fig. 3. The addition of diatomaceous earth or other filter aid to the finished paper, when thus returned, will be equal to about .066% to 1.66% of its finished weight, and in the specific example given it will be about 1.66% of such weight.

The amounts of filter aid per weight of water (whether fresh or white water) hereinbefore given are representative of proven commercially effective proportions, but cannot be considered as exclusive of other possibly effective proportions particularly related to the characteristics of the water to be filtered, as has been intimated in the foregoing. Thus, not only the proportion of filter aid used, but also its particular type will be governed by the type of operation performed. For white water filtration a diatomaceous earth product having a moderate flow rate and high clarifying power, such for example as the grade known commercially as "Dicalite Speedplus" will give a high degree of satisfaction, though other grades, faster or slower, may be used with good results. If fresh water only is to be filtered, it is possible to use a much more open and faster grade, or to use only a precoat of filter aid on the leaf or drum.

For either purpose it is possible to substitute for diatomaceous earth a filter aid made by heat-expanding and comminuting a volcanic glass such as pearlite, silver sand, pumice or volcanic ash, as described in the copending applications of A. R. Bollaert, Serial No. 688,430, entitled Light Weight Mineral Filter Aids and now abandoned, and of E. J. Mayhew, Serial No. 690,071, entitled Heat Treatment of Volcanic Ash, also abandoned. These products, together with diatomaceous earth, are referred to generally and generically as mineral filter aids, it being understood that this term does not include sand, which is not a filter aid and which, when used in the ordinary form of a sand pack, does not produce a degree of clarification and purification such as to permit the filtrate to be used in high pressure showers.

In the use of even slightly alkaline waters it is common practice to add alum to the system to bring the pH of the water to that most favorable for sheet formation. Similarly, various sizing agents are commonly added, as well as toxic agents for slime control. In conventional practice it is unavoidable that portions of these water soluble additives and colloidal substances should be carried away with the run-off water. The closed system of Fig. 3 is highly advantageous in causing such additives to be retained almost completely in the system, the only withdrawal being in the relatively small amount of water passing to the driers with the wet sheet. In any system, open or closed, the concentration of any additive will build up until the amount withdrawn in run-off plus wet sheet equals the quantity added, and in eliminating or even reducing the amount of run-off an optimum concentration may be reached with a correspondingly reduced addition of the agent. This generally applies to all water soluble additives such as alum, sizes, soluble colors and toxic agents, as well as to fillers of small particle size such as titanox, lithopone, bentonite, kaolin, carbon black, etc.

In the filtration of any water for use in high pressure showers, it is essential to bring the water to substantial clarity, though as a rule slight haziness may be tolerated. It is essential also that the water be free from algae or other gelatinous matter and that scale forming components be reduced to the lowest terms. These impurities ordinarily are absent from recirculated white water which passes through repeated filtrations, and the filter aids named completely remove algae from lake or stream water and tend strongly to reduce scale forming constituents. In filtering fresh water, however, it may in some instances be desirable to introduce coagulants, iron and calcium precipitants and the like into the water supply, but always following with a filtration to clarify using a mineral filter aid.

Figure 4:
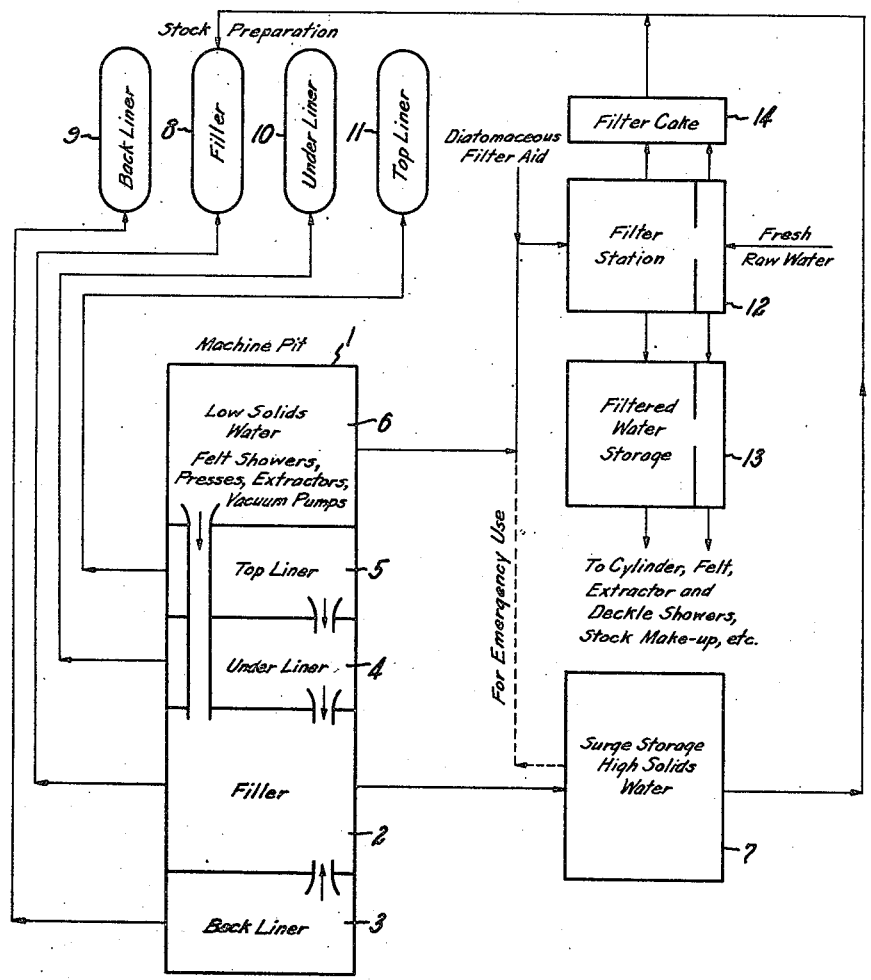
Fig. 4 is a flow diagram illustrating the selection and handling of water in a conventional paperboard mill installation employing the filtration practice of the invention.

In some instances, as has hereinbefore been indicated, in order to reduce the load imposed upon the filters, a selection of the white water to be filtered may be made, and such an installation is illustrated schematically by the flow diagram of Fig. 4. As there shown, the machine white water pit 1 may be considered as divided into compartments for reception and primary separation of white water coming from the several functional elements of the paper or paperboard machine and of varying clarity for recirculation related to the types, qualities and amounts of solids it contains. Having reference to a paperboard machine of the cylinder type, the compartments 2, 3, 4 and 5 will receive relatively high solids water of differing furnishes coming, respectively, from the filler, back liner, under liner and top liner cylinders, and spill-over from compartments 3, 4 and 5 is preferably conducted to compartment 2 inasmuch as the mixed furnishes of the white waters thus commingled will be suitable for filler stock or furnish. Another compartment 6 will receive only low solids water such as is derived from the felt showers, presses, extractors and vacuum pumps, and spill over from this compartment is also conducted to the filler compartment 2. The mixture of white waters in compartment 2 may run or be pumped into a surge storage tank 7 for high solids water.

White water from the compartments 2, 3, 4 and 5 is returned to the stock preparation apparatus for the various respective furnishes such as the beaters 8, 9, 10 and 11, and the commingled white washers in the surge storage tank 7 may be pumped to the filler stock beater 8.

In accordance with this arrangement it will be seen that a great volume of the white water may be recycled in the papermaking operation without filtration while, at the same time, maintaining a closed water system.

Low solids water from the compartment 6, with the addition of filter aid of proper type and in suitable amount, is pumped to the filters at the filter station 12 and fresh water may be added in the filtering operation to compensate for the losses hereinbefore referred to. The filtrate may be run direct, or by way of a filtered water storage tank 13, to the showers for the cylinders, felts, extractors and deckles, and may be used also for stock make-up and other services requiring filtered water.

As earlier indicated, after completion of a filtration cycle, which may vary as to duration dependent upon the characteristics of the water being filtered, the filter cake will be dumped into a sump 14 or the like wherefrom, after proper thinning and, if desired, sterilization, in accordance with the invention of my application Serial No. 171,471 already referred to, it may be pumped to storage or to the filler stock beater 8.

For emergency use, or when desired, the commingled white waters held in the surge storage tank 7 may be conducted to and run through the filters, as indicated by the broken line, Fig. 4.

It will therefore be apparent that although only a portion of the white water is filtered, the desired closed water system is maintained, while the load on the filters is greatly lessened.

A further advantage in making a proper selection and handling of the white water to be filtered has reference to an avoidance of heat build-up in the closed water system. In accordance with accepted mill practice, filler stock may be heated to about 180° F., and back liner and under liner stock to about 140° F. Top liner stock, which usually carries sizing, is normally heated to about 90° F., and where sizing is carried 120° F. would be maximum heating. The average increase in heat due to friction, refining and the like is about 30° F. to 40° F. Thus, with a closed water system, even though filtration were employed, the temperature of the water might easily build up in excess of the 120° F. limit if there were no separation and selection of the water to be filtered.

When the water is separated and selected as disclosed, and only low solids water run through the filters, the only high temperature water comes from vacuum pumps connected with press, primary or extractor rolls, and from plain presses. The rest of the low solids water comes from the felt showers and by way of fresh water make-up which latter, when well water is used, will have a temperature of approximately 55° F., and when from surface streams or ponds will have a temperature of from about 33° F. to 80° F. It will be apparent, therefore, that with proper separation and selection the temperature of the water in the closed system may quite readily be maintained below the said 120° F.

Having reference to Figs. 5 and 6, which embody substantially the same filtration system as that disclosed in my said application Serial No. 171,471, it will be seen that a battery or group of paper-making machines 15 may be fed by their stock chests 16 to which paper stock is supplied from a beater or hydrapulper 17. Each of the machines has a white water pit 18 adapted to catch all spill of white water from the machine, and the white water thus collected is preferably conducted, as by pumps 19, through a conduit 20 to a screen 21 upon which relatively large or bulky materials are caught, and thence by means 22, such as sedimentation or flotation apparatus, or a Dorr clarifier, in which a major portion of the heavier solids are trapped and produce a sludge of usable paper fibres and the like. From the clarifying or sludge-collecting means 22 the white water is conducted through a conduit 23, preferably provided with a pump 24, to a mixing tank 25.

In order to accommodate an excess of white water issuing from the pits 18, and to prevent undesirable surges, a bypass conduit 26 is provided for conducting the excess to a white water storage tank or basin 27.

In the event that only low solids white water from the machines is selected for treatment, the means 22 may be a low solids basin with an overflow connection 26' to the white water storage tank or basin 27.

In the interest of economy of installation, only one filter press 28 (shown as of conventional plate and frame type) may be employed, although a battery of such filter presses may be provided, and the filter press is connected by a pump 29 and conduit 30 with the mixing tank 25 into which the white water is normally introduced through the conduit 23; or when necessary or desired white water may be drawn from the storage tank or basin 27 through a pump 31 and conduit 32.

The mixing tank 25 is provided with a hopper 33 through which a selected filter aid, preferably diatomaceous earth, may be fed continuously, and at a predetermined rate, and thus in proportion to the white water introduced into the mixing tank, and the mixing tank may be provided with a stirrer or agitator, not shown, if desired.

The filtrate, filtered white water, passes, under pressure optionally in the order of from 10 p. s. i. to 85 p. s. i., from the filter press 28 through a conduit 34 to points for recirculation in the paper-making process and apparatus, such as the high-pressure-low volume showers, water deckles, for make-up of paper stock, etc. Ordinarily the conduit 34 is furnished with a sight glass 35 whereby a visual check on the clarity of the filtrate may be made.

After the filter press has been operated in a filtration cycle of predetermined duration relative to its effectiveness in output flow rate and clarity of filtrate, the pump 29, or the pumps 31 and 29, will be stopped and the plates and frames of the press separated to clean the filter cake from them and discharge it into a sump 36 from which it may be conducted by a pump 37 and conduit 38 to the beater or hydrapulper 17 or to a point of storage or treatment for future use in the paper-making operation.

Fresh water to compensate for that lost through evaporation, as in the machine driers, or otherwise dissipated, may be introduced into the system at any appropriate point. As shown, such water may be fed to the mixing tank 25 by way of a conduit 39, thereby to be subjected to the operation of the filter press 28.

For convenience, economy and added efficiency in operation, the plates 40 (Fig. 6) of the filter press may be furnished, in addition to the usual filter cloths 41, with sheets of paper 42 of appropriate kind, thickness and porosity (nine point semi-chemical or kraft corrugating paper having been found to be effective), interposed between the frames 43 and the cloths 41. These sheets of paper 42 not only provide in themselves a filter medium supplementing the cloths 41, but protect the cloths from the somewhat abrasive action of the filter aid, and contribute to the ease with which the filter cake may be removed from the plates and filter cloths when cleaning of the filter is undertaken after termination of a filtration cycle, as described. Moreover, being formed of paper stock usually suitable for reuse in, and hence return to, the paper-making operation, the sheets of paper may be discharged into the sump 36 along with the filter cake adhering to them.

Obviously, during the operation of cleaning the filter press after a filtration cycle, the white water conducted from the white water pits 18 through the pump and conduit system 19—20—26 may be held in storage in the storage tank or basin 27. If a battery of filter presses, for example two, is installed, the piping from the pump 29 of the mixing tank 25 may be so arranged, and provided with such valves, that when one filter press is being cleaned the other, or others, may be operating upon the filtering cycle, thus making the filtering operation continuous and capable of handling a concomitantly larger volume of white water to furnish a continuous supply of filtrate for the closed system.

As hereinbefore indicated, a siliceous mineral filter aid, preferably diatomaceous silica (diatomaceous earth) has been found to be most effective in the practice of the invention. This is probably primarily due to the fact that the irregular shaped diatoms arrange themselves in the cake in an interlaced fashion that entraps even the smallest particles of foreign matter in the water. At the same time, millions of microscopic interstices are formed that permit the unobstructed flow of water through the cake. The bulky, porous cake formed when the diatomaceous silica is dispersed through the water fed to the filter is one of the factors upon which the effectiveness of the filtration is based. The open spaces in the cake constitute nearly 90% of its surface area, yet the openings are so minute that even bacteria are filtered out. Those slime and odor-producing microorganisms which do pass through may easily be controlled by chlorinating the filtrate, as disclosed in my application Serial Number 171,471.

In a practical commercial installation of apparatus for the practice of filtration of paper-mill white water in accordance with the invention, it has been found, upon the carrying out of a bacteriological survey, that the filtration apparatus itself practically eliminates all spore-forming bacteria, thus removing one odor and slime factor, and substantially reduces the presence of all other types of bacteria. It was found, also, that the use of the sterilized filtrate in recirculation in the system effectively stopped slime accretion, even when only a small amount of chlorine was used, whereas, prior to the use of such filtrate, the water, even when highly chlorinated, did not prevent the accretion of slime.

Moreover, this filtration practice has greater efficiency than any other now known in the paper-making industry for the filtration of so-called "process" or re-used water, it having been indicated by the bacteriological survey referred to to be effective in removing from paper-mill white water from 80% to 95% of all types of odor and slime producing bacteria.

When a paper-making machine, or an entire paper mill, functions with a closed water system, as is made possible in accordance with the invention, other economies in operation will follow by virtue of the fact that stock-bearing water normally escaping by spillover or other leakage, such as from cylinder molds, stock chests and the like, need not be carefully controlled or guarded against as it will not be lost but will be collected for passage through the filter apparatus and returned to the paper-making machine as filtered water and usable fibre and filter cake.

In relation to economy in water consumption in paper-making machines with which the procedure of the invention is employed, especially where a closed water system is thereby made possible, it is to be noted that a saving of up to 95.4% can be effected. Also, the circulating water being in a heated condition because of necessary normal heating in the paper-making operation from which it has already been derived, marked economies in fuel consumption are attained, as hereinbefore indicated. And it has been demonstrated in the operation of such a closed water system that the saving in fuel required for heating the water used will, in itself, offset the cost of maintaining the filtration system in operation, having reference particularly to outlay for filter aid, filter papers and cloths, and sterilizing and treating chemicals. Moreover the operation of the system indicates that this saving in heat alone will, in a mill with a completely closed water system, offset all operating labor and material costs and justify installation of the system upon a reasonable investment return basis.

Also, in a closed water system the constant reuse of filtered, sterilized water makes for a cleaner system and use of less fresh water, and the sterilization of the bacteria and other organisms results in a higher flow rate for the filter apparatus and hence in more efficient operation of the system.

Furthermore, it has been found that by using the high pressure showers and chlorinated filtered water, felt life has been increased 300 to 500 tons per felt, or approximately 10% to 15%. And a saving of approximately 30 cents per ton of board has been realized by furnish changes made possible by increase in brightness of the board when using the filtered water in place of fresh water. Some reduction has also been made in the amount of titanium used in top liner furnish.

It will thus be seen that the practice of the invention results in more efficient operation of paper and paperboard mills, not only because of the economy in water consumption but due also to better handling of the water used and to savings in paper stock, chemicals and machine maintenance. Moreover, the properties of the paper product are improved.

Various changes and modifications are considered to be within the principle of the invention and the scope of the following claims.

What is claimed is:

1. In a paper making operation including the steps of forming a paper furnish comprising an aqueous slurry containing paper fibres, and passing such slurry to a paper web forming operation having as one result the discharge of water having a solids content including paper fibres, the method of treating such discharged water to remove therefrom its solids content and produce water reusable in the paper making operation, which comprises the steps of pumping and thereby establishing a pressure head in the said discharged water and passing it while maintaining such pressure head through a filter apparatus furnished with a particulate filter medium dissimilar to the paper fibres and not injurious to a paper web formed from such fibres and of a character and in an amount sufficient to remove from such water substantially all of its solids content, returning at least a portion of the filtrate to the paper making operation, and collecting and conserving the filtered-out solids content for reuse in the paper making operation, said filter medium being diatomaceous earth.

2. In a paper making operation including the steps of forming a paper furnish comprising an aqueous slurry containing paper fibres, and passing such slurry to a paper web forming operation having as one result the discharge of water having a solids content of paper stock including such paper fibres, and said water being of at least two types one of which has a high solids content and the other a low solids content, the method of conserving the paper stock carried by said discharged water and the water itself, which comprises the steps of separating the low solids water from the high solids water and maintaining them thus separated for filtration of the low solids water, pumping and thereby establishing a pressure head in at least a portion of the low solids water and passing it while maintaining such pressure head through a filter apparatus furnished with a filter medium dissimilar to the paper fibres and not injurious to a paper web formed from such fibres and of a character and in an amount sufficient to remove from such water substantially all of its solids content, returning at least a portion of the filtrate to the paper making operation, and collecting and conserving the filtered-out solids content for reuse in the paper making operation, said filter medium being diatomaceous earth.

3. In a paper making operation including the steps of forming a paper furnish comprising an aqueous slurry containing paper fibres, and passing such slurry to a paper web forming operation having as one result the discharge of water having a solids content of paper stock including such paper fibres, the method of performing such paper making operation with a so-called closed water system, which comprises the steps of pumping and thereby establishing a pressure head in the said discharged water and passing it while under such pressure through a filter apparatus furnished with a particulate filter medium dissimilar to the paper fibres and not injurious to a paper web formed from such fibres and of a character and in an amount sufficient to remove from such water substantially all of its solids content, returning the filtrate to the paper making operation, returning the filtered-out solids to the paper making operation, and adding fresh water to said operation in an amount at least sufficient to compensate for evaporation and other minor losses, said filter medium being diatomaceous earth.

4. In a paper making operation including the steps of forming a paper furnish comprising an aqueous slurry containing paper fibres, and passing such slurry to a paper web forming operation having as one result the discharge of water having a solids content of paper stock including such paper fibres and said water being of at least two types one of which has a high solids content and the other a low solids content, the method of performing such paper making operation with a so-called closed water system and conserving the paper stock carried by said water and the water itself, which comprises the steps of separating the low solids water from the high solids water and maintaining them thus separated for filtration of the low solids water, pumping and thereby establishing a pressure head in at least a portion of the low solids water and passing it while under such pressure head through a filter apparatus furnished with a particulate filter medium dissimilar to the paper fibres and not injurious to a paper web formed from such fibres and of a character and in an amount sufficient to remove from such water substantially all of its solids content, returning at least a portion of the filtrate to the paper making operation, returning the filtered-out solids to the paper making operation for incorporation in said slurry, returning the high solids water to a step in the paper making operation in advance of the web forming step, and adding fresh water to said operation in an amount at least sufficient to compensate for evaporation and other minor losses, said filter medium being diatomaceous earth.

5. In a paper making operation including the steps of forming a paper furnish comprising an aqueous slurry containing paper fibres, and passing such slurry to a paper web forming operation having as one result the discharge of water having a solids content comprising paper stock, the method of treating such discharged water to remove therefrom its solids content and produce water reusable in the paper making operation, which comprises the steps of pumping and thereby establishing a pressure head in the said discharged water and passing it while maintaining such pressure head through a filter apparatus furnished with a particulate filter medium dissimilar to the paper fibres and not injurious to a paper web formed from such fibres and of a character and in an amount sufficient to remove from such water substantially all of its solids content and at least 80% of entrained odor and slime forming bacteria, returning at least a portion of the filtrate to the paper making operation, and collecting and conserving the filtered-out solids content for reuse in the paper making operation, said filter medium being diatomaceous earth.

References Cited in the file of this patent
UNITED STATES PATENTS

| | | |
|---|---|---|
| 193,344 | Morton | July 24, 1877 |
| 296,463 | Rupp | Apr. 8, 1884 |
| 524,007 | Vellenoweth | Aug. 7, 1894 |
| 828,500 | Parker | Aug. 14, 1906 |
| 898,212 | Gaara et al. | Sept. 8, 1908 |
| 951,183 | Gaara | Mar. 8, 1910 |
| 1,198,039 | Krause | Sept. 12, 1916 |
| 1,579,171 | Zoul | Mar. 20, 1926 |
| 1,604,652 | Manning | Oct. 26, 1926 |
| 1,797,789 | Patillo | Mar. 24, 1931 |
| 2,100,149 | Qviller | Nov. 23, 1937 |
| 2,103,572 | Wells | Dec. 28, 1937 |
| 2,214,943 | Tinsley | Sept. 17, 1940 |
| 2,368,635 | Booth | Feb. 6, 1945 |
| 2,423,172 | Booth | July 1, 1947 |
| 2,468,188 | Frankenhoff | Apr. 26, 1949 |
| 2,517,753 | Ximenez et al. | Aug. 8, 1950 |

OTHER REFERENCES

Manufacture of Pulp and Paper (1929), vol. 5, sec. 1, pp. 24, 25 and 29, pub. by McGraw-Hill Book Co., New York, N. Y.

Manufacture of Pulp and Paper, 3rd ed., vol. V, sec. 1, pp. 18–23, pub. by McGraw-Hill, New York, (1939).

Hall: Pacific Pulp & Paper Ind., April 1941, pp. 50–52.

Dicalite, Bulletin F50 pp. 2–9, pub. by The Dicalite Co., New York (1943).

Halvorsen, Paper Trade J., October 30, 1947, pp. 37–41.